March 1, 1927.
W. D. HUFF
1,619,792
RAIL JOINT
Filed July 7, 1926
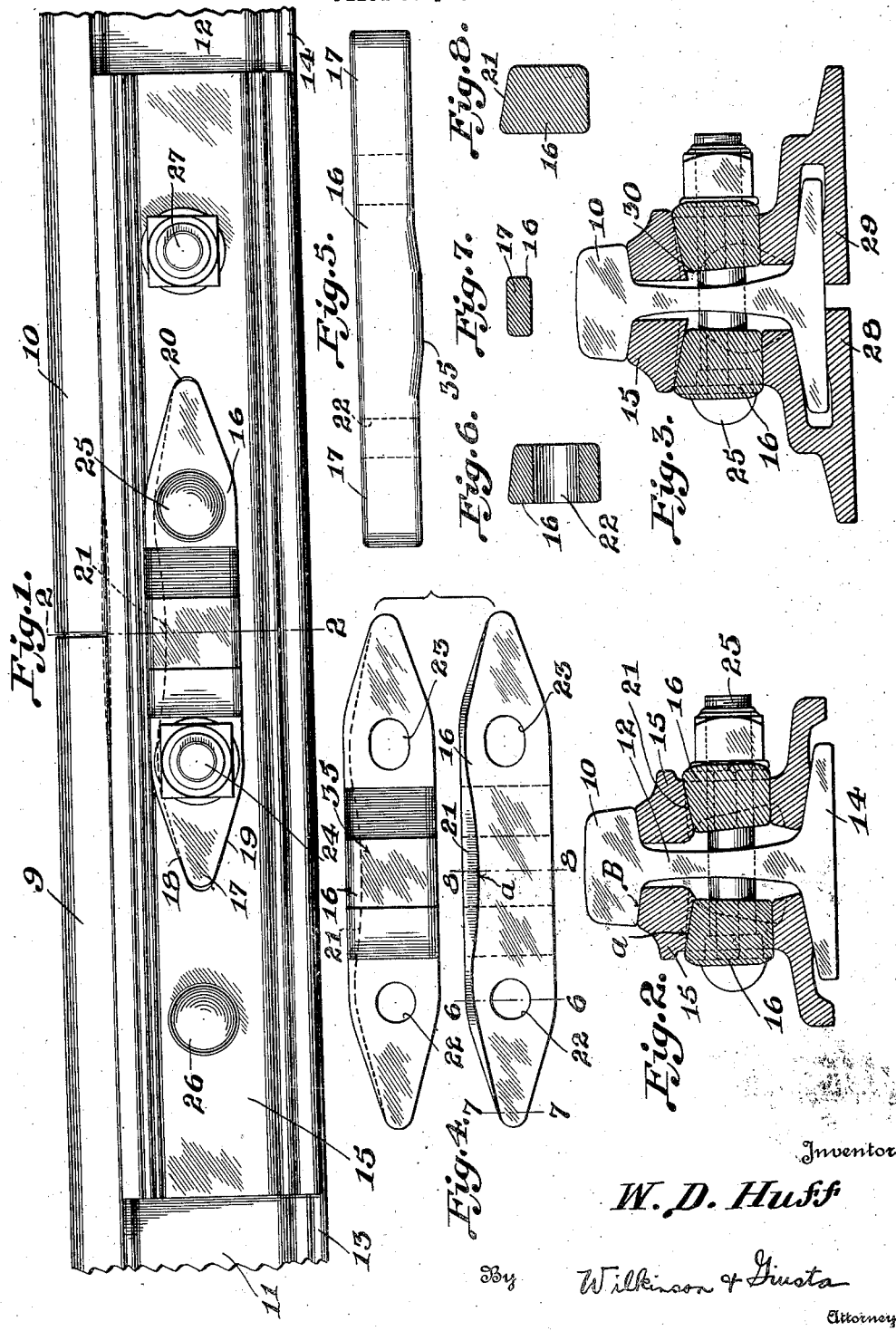
Inventor
W. D. Huff
By Wilkinson & Giusta
Attorneys.

Patented Mar. 1, 1927.

1,619,792

UNITED STATES PATENT OFFICE.

WILLIAM DANIEL HUFF, OF LAFAYETTE, LOUISIANA, ASSIGNOR OF ONE-HALF TO JOHN A. GORR, OF LAFAYETTE, LOUISIANA.

RAIL JOINT.

Application filed July 7, 1926. Serial No. 120,986.

The present invention relates to improvements in rail joints and has for an object to provide an improved rail joint in which the wear of the joint and the rail under the ball will be reduced and may be compensated for.

Another object of the invention is to provide a construction for accomplishing the above purpose without the use of shims and with a minimum of departure from the existing forms of fish plates or splice bars and other joint parts.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary side view of two rail ends coupled by a standard type of joint embodying the present invention.

Figure 2 is a vertical section taken on the line 2—2 in Figure 1.

Figure 3 is a similar view showing a different type of standard splice bar embodying the present invention.

Figure 4 shows outer and inner views of the wedge block.

Figure 5 is an edge view thereof.

Figure 6 is a cross section taken on the line 6—6 in Figure 4.

Figure 7 is a similar view taken on the line 7—7 in Figure 4, and

Figure 8 is also a cross section taken on the line 8—8 in Figure 4.

Referring more particularly to the drawings 9 and 10 designate the balls or heads of two adjacent rails of standard construction having respectively the webs 11 and 12 and the flanges 13 and 14.

The fish plates or splice bars are shown at 15 as being of the general form customarily in use at the present time. The invention consists in modifying the fish plate or splice bar by forming an irregular opening through the intermediate portion thereof. This opening opens out upon both inner and outer faces of the fish plate or splice bar and it is designed to receive a wedge block indicated generally at 16. The wedge block is formed with the tapering ends 17 having the divergent wedge shoulders 18 and 19 for cooperating with similar portions of the end walls of the slot 20. The intermediate portion of the wedge block is of generally uniform shape, except that the upper portion thereof is provided with a bevel edge 21, which inclines both downwardly and inwardly and also slopes from the opposite ends of the wedge block downwardly uniformly toward the center thereof and is rounded in this aspect as seen in Figure 4. The top wall of the slot 20 is shaped to agree. The wedge block is provided with a round hole 22 in one end portion and with the oblong opening 23 in the other end portion. These openings receive the fastening bolts 24 and 25. The bolts for holding the fish plates or splice bars together are indicated at 26 and 27. These bolts 26 and 27 pass through the rail webs and through the fish plates or splice bars. The bolts 24 and 25 pass through the rail webs and through two wedge blocks, whereby to draw these wedge blocks together upon their respective fish plates or splice bars. The wedge blocks will tend to expand the inherently resilient metallic fish plates or splice bars thus spreading the same both upwardly and downwardly between the rail head and the rail flange, and thus compensating for any wear or inequality that may be or take place under the ball or head.

It is preferred that the base portions of the wedge blocks and openings in which they fit be of less taper than the upper edges and upper portions of the openings as a more effectual seat is thereby secured, and the expansion is effected more particularly at the upper portion of the fish plates or splice bars. In fact the lower portions may preferably be substantially horizontal if desired. The sloping upper portion 21 will tend to floatingly seat the wedge block and will cause opposite sides of the wedge block to act equally at the lowest point of this tapered surface 21, which is preferably arranged immediately below the gap between the rails and is made sufficiently deep so that the angle will be slightly greater than the angle under the head of the rail, this to prevent the possibility of top of the splice bar working out. The wedge block will preferably be of slightly less length than the opening in which it fits in order to permit this longitudinal floating action.

In Figure 3 the device is shown as applied to the common standard continuous joint arrangement. This type of joint has commendable advantages over the angle bar type, but is difficult or almost impossible to tighten under the head of the rail when worn. This will be overcome with my device which will permit this type of bar to be used and provide a means to keep the joint tight and compensate for wear that may occur.

The upper surface or face of the wedge block, as well as the corresponding face in the slot of the splice bar, are so shaped that compensation is provided for uniformity from the center to each end, the wear of the rail under the ball and the upper face of the splice bar reaching a maximum at the gap between the rails and tapering uniformly away from the gap or from the center of the splice bar.

The angle downward at the two points shown in line *a* is slightly greater than the angle B under the head of rail; this to prevent possibility of this section of bar from pushing out under pressure.

It is obvious that various changes and modifications may be made in the details of construction and design of the above specifically described embodiment of this invention without departing from the spirit thereof, such changes and modifications being restricted only by the scope of the following claims.

What is claimed is:—

1. A rail joint construction comprising a splice bar having an opening therein with wedge-shaped end portions, and a wedge block fitted adjustably in said opening also having wedge-shaped end portions.

2. A rail joint construction comprising a splice bar having an opening therein with an upper wall tapered both longitudinally and laterally, and a wedge block fitting in the opening and having an upper edge to correspond with the upper edge of the opening.

3. A rail joint construction comprising a pair of splice bars adapted to be fitted upon opposite sides of abutting rail ends, means for securing said splice bars to the rail ends, said splice bars fitting over the rail flanges and beneath the rail heads, said splice bars having openings therein with wedge-shaped ends and with an upper wall sloping both longitudinally and laterally and being curved longitudinally to a low central point beneath the gap between the rails, wedge blocks fitting in the openings in opposed splice bars and having wedge-shaped ends with upper edges shaped to fit the upper edges of the openings in the splice bars, and bolts passing in common through the rail webs and through both opposed wedge blocks for drawing the same together simultaneously.

WILLIAM DANIEL HUFF.